United States Patent
Jahn et al.

(10) Patent No.: US 10,959,042 B2
(45) Date of Patent: Mar. 23, 2021

(54) LOCATING A MOBILE TERMINAL BY MEANS OF A VEHICLE

(71) Applicant: Audi AG, Ingolstadt (DE)

(72) Inventors: Nicky Jahn, Ingolstadt (DE); Florian Leopold, Breitenbrunn (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/753,956

(22) PCT Filed: Oct. 22, 2018

(86) PCT No.: PCT/EP2018/078879
§ 371 (c)(1),
(2) Date: Apr. 6, 2020

(87) PCT Pub. No.: WO2019/096544
PCT Pub. Date: May 23, 2019

(65) Prior Publication Data
US 2020/0359161 A1    Nov. 12, 2020

(30) Foreign Application Priority Data

Nov. 16, 2017  (DE) .................... 10 2017 220 509.1

(51) Int. Cl.
*H04W 4/02*    (2018.01)
*H04W 4/021*   (2018.01)
*H04B 17/318*  (2015.01)

(52) U.S. Cl.
CPC .......... *H04W 4/021* (2013.01); *H04B 17/318* (2015.01)

(58) Field of Classification Search
CPC .............................. H04W 4/021; H04B 17/318
USPC ...................................................... 455/456.1
See application file for complete search history.

(56) References Cited

U.S. PATENT DOCUMENTS

| | | | |
|---|---|---|---|
| 6,570,532 B2 | 5/2003 | Mise et al. | |
| 9,008,917 B2 | 4/2015 | Gautama et al. | |
| 9,123,244 B2 | 9/2015 | Daman et al. | |
| 9,587,948 B2 | 3/2017 | Schuller et al. | |
| 2015/0028995 A1 | 1/2015 | Gautama et al. | |
| 2016/0320469 A1 | 11/2016 | Laifenfeld et al. | |

FOREIGN PATENT DOCUMENTS

| | | |
|---|---|---|
| DE | 10103034 A1 | 8/2001 |
| DE | 10201474 A1 | 5/2003 |
| DE | 102013224330 A1 | 7/2014 |
| DE | 102014002150 B3 | 7/2015 |

(Continued)

OTHER PUBLICATIONS

International Search Report and Written Opinion of the International Searching Authority directed to related International Patent Application No. PCT/EP2018/078879, with certified English-language translation of Written Opinion, dated Feb. 5, 2019; 23 pages.

(Continued)

*Primary Examiner* — Joel Ajayi
(74) *Attorney, Agent, or Firm* — Sterne, Kessler, Goldstein & Fox P.L.L.C.

(57) ABSTRACT

This disclosure relates to a method for determining a position of a mobile terminal in an interior of a vehicle or in surroundings of the vehicle. A radio signal emitted by the mobile terminal at a carrier frequency assigned to a channel of a selected radio technology is received by at least one antenna that is mounted on the vehicle.

11 Claims, 5 Drawing Sheets

(56) References Cited

FOREIGN PATENT DOCUMENTS

| DE | 112014001445 T5 | 1/2016 |
|---|---|---|
| WO | WO 2017127743 A1 | 7/2017 |
| WO | WO 2017181050 A1 | 10/2017 |

OTHER PUBLICATIONS

ISM Band, Wikipedia, published Apr. 18, 2019, with certified English-language translation; 10 pages; available at: https://de.wikipedia.org/wiki/ISM-Band, accessed Feb. 27, 2020.

Bulten, Wouter, "Kalman filters explained: Removing noise from RSSI signals", published Oct. 11, 2015; 6 pages, available at: https://www.wouterbulten.nl/blog/tech/kalman-filters-explained-removing-noise-from-rssi-signals/.

International Preliminary Report on Patentability directed to related International Patent Application No. PCT/EP2018/078879, dated Jan. 30, 2020, with attached English-language translation; 17 pages.

| SRD Kanäle | | | | | | | | | | | | | | | | | | | | | | | | | | | | | | | | | | | | | | | | Short Range Devices (SRD) | | | | | | | | | | | | | | | | | | | | | | | | | | | | | | | | | | | | | | |
|---|---|
| WLAN Kanäle | WLAN 802. 11b/g Kanal 1 | | | | | | | | | | | | | | | | | | | | WLAN 802. 11b/g Kanal 6 | | | | | | | | | | | | WLAN 802. 11b/g Kanal 11 | | | | | | | | | | | |
| Bluetooth Advertising Kanäle 37 | | | | | | | | | | | | | | | | | | | | | 38 | | | | | | | | | | | | | | | | | | | | 39 |
| Bluetooth Data Kanäle | 0 | 1 | 2 | 3 | 4 | 5 | 6 | 7 | 8 | 9 | 10 | | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | | 35 | 36 | |
| Frequenz MHz | 2402 | 2404 | 2406 | 2408 | 2410 | 2412 | 2414 | 2416 | 2418 | 2420 | 2422 | 2424 | 2426 | 2428 | 2430 | 2432 | 2434 | 2436 | 2438 | 2440 | 2442 | 2444 | 2446 | 2448 | 2450 | 2452 | 2454 | 2456 | 2458 | 2460 | 2462 | 2464 | 2466 | 2468 | 2470 | 2472 | 2474 | 2476 | 2478 | 2480 |

LOCATING A MOBILE TERMINAL BY MEANS OF A VEHICLE

TECHNICAL FIELD

The invention relates to a method for determining a position of a mobile terminal in an interior of a vehicle or in surroundings of the vehicle, where a radio signal emitted by the mobile terminal at a carrier frequency assigned to a channel of a selected radio technology is received by at least one antenna that is mounted on the vehicle.

BACKGROUND

Locating or situating a mobile unit as precisely as possible is a substantial requirement for numerous applications. Therefore, methods for determining a position of a mobile unit are of high economic relevance.

A known application is situating a person by means of a mobile smartphone carried by the person. For example, it can be helpful when searching for a missing or a kidnapped person. However, a free choice of a place to stay belongs to the so-called personality rights of every natural person. Therefore, the location of a person is an object of their informational right of self-determination, i.e., the person must be able to allow or prohibit the specification of a position of a smartphone he or she is carrying.

Accordingly, DE 102 01 474 A1 discloses a method for authorizing a query of a position of a first terminal by a second terminal. If the first terminal is a mobile terminal, which is arranged in a mobile radio cell of a mobile radio network and communicates wirelessly with a base station of the mobile radio network, which defines the mobile radio cell, the distance between the first terminal and the base station can be determined on the basis of a reception level measured by an antenna of the base station.

The location of a person also plays a crucial role in rescuing people. Targeted rescue measures can only be carried out after the most accurate localization of a person in need of help.

From DE 101 03 034 A1, a method for determining a position of a person seeking help is known, in which the person seeking help has a GPS terminal (Global Positioning System) wirelessly connected to a message center and a mobile terminal that is separate from the GPS terminal and which is wirelessly connected to the GPS terminal. The mobile terminal has an emergency call button and the GPS terminal has a device for measuring a reception level of a radio signal of the mobile terminal. In the event of an emergency call made with the emergency call button, the GPS terminal can transmit both its position in the form of GPS coordinates and the measured reception level. A distance between the mobile terminal and the GPS terminal can be calculated in the message center from the reception level. In this way, a position of the person seeking help in the form of a circumference around the transmitted position of the GPS terminal can also be determined if the person seeking help has moved away from the GPS terminal and his or her position deviates from the position of the GPS terminal.

Even a mobile unit that moves autonomously or at least partially autonomously must precisely determine its own position in order to correctly determine a further movement in the direction of a target, starting from the current position.

DE 10 2014 002 150 B3 discloses a method for determining a position of a mobile unit, for example a vehicle, on the basis of an image of the surroundings of the mobile unit, which is detected by an optical sensor of the mobile unit, by means of a previously stored image of the environment. A first position hypothesis for the position of the mobile unit is formed from the relative positions of certain objects within the captured image and the relative positions of the specific objects within an image of the surroundings, which has been previously stored from a known position. In addition, further position hypotheses for the position of the mobile unit can be formed in a similar manner, for example on the basis of a plurality of reception levels of WLAN radio signals measured by the mobile unit, which are transmitted by antennas in surroundings of the mobile unit. The position of the mobile unit is then determined by merging the position hypotheses formed.

In all of the aforementioned methods, an antenna measures a reception level of a radio signal emitted by a transmitter. A corresponding received signal strength indicator (RSSI) is then determined from the measured received level, which in turn allows a distance between the transmitter and the antenna to be calculated.

Methods for determining a position using radio technology are described in US 2016/0320469 A1 in connection with a keyless entry to a vehicle, in WO 2017/181050 A1 for the purpose of authorizing a mobile terminal and in DE 11 2014 001 445 T1 for warning in case of theft of an object carried in a vehicle.

A radio signal of a mobile terminal that conforms to a specific radio technology has a so-called carrier frequency, which is usually assigned to a so-called ISM frequency band (Industrial, Scientific and Medical Band) reserved for the specific radio technology. For example, the 2.4 GHz band is reserved for the popular wireless technologies WLAN (Wireless Local Area Network) and Bluetooth. In many cases, the ISM frequency band is divided into a plurality of numbered channels, each of which is assigned to a specific carrier frequency. As usual, a channel is understood to be a narrow frequency range with respect to a width of the ISM frequency band. Depending on the specific radio technology, a reception strength value is determined from a plurality of reception levels of a frequency spectrum or from a reception level averaged over several channels.

If a plurality of mobile terminals are arranged in an interior of a vehicle or in surroundings of the vehicle, each of which transmits radio signals on different channels of an ISM frequency band, this can have a negative influence on the determination of a reception strength value, for example as a result of overlaps in the edge areas of adjacent channels. A reception strength value determined under these conditions can have sudden changes over time, which results in corresponding jumps in the calculated distance. Such fluctuations can only be partially removed from the determined reception strength value by means of special filters, for example by means of a Kalman filter or a particle filter.

DETAILED DESCRIPTION

The invention is therefore based on the object of specifying an improved method for determining a position of a mobile terminal in an interior of a vehicle or in surroundings of the vehicle, which avoids the disadvantages described and enables precise localization of the mobile terminal. In addition, it is an object of the invention to provide a vehicle, which is suitable for carrying out the method according to the invention.

One object of the invention is a method for determining a position of a mobile terminal in an interior of a vehicle or in surroundings of the vehicle, where a radio signal emitted by the mobile terminal at a carrier frequency assigned to a channel of a selected radio technology is received by at least one antenna that is mounted on the vehicle. The invention is described with reference to a vehicle, but does not necessarily require a vehicle. For example, the described method can easily be carried out for an interior of a building or the like.

In the method according to the invention, exactly one specific radio technology channel is evaluated in order to determine the position of the mobile terminal. In contrast to other methods, no frequency spectrum or a plurality of channels of the radio technology are evaluated. Instead, the evaluation is limited to a specific channel of radio technology.

In a preferred embodiment, the radio signal transmitted by the mobile terminal is received by a plurality of antennas arranged in an interior of the vehicle. The more antennas that are used to determine the position of the mobile terminal, the more precise the determined position. If there are more than three antennas, the position of the mobile terminal is overspecified. An overdetermination can, however, contribute to further increasing the precision of the specified position of the mobile terminal.

In a further preferred embodiment, a reception level assigned to the antenna is measured for a plurality of antennas, in particular each antenna, and a reception strength value (RSSI) is determined from the measured reception level. A reception level can be measured easily, and a reception strength value can be calculated from the measured reception level simply by using the formula $$RSSI(P) = RSSI(P_0) - 10n \log_{10}(P/P_0).$$

Thereby, RSSI(P) is the reception strength value, P is the reception level measured by the antenna in mW, n is a so-called path loss exponent to be specified depending on the surroundings, which usually takes a value between 2 and 4, $P_0$ is a reception level measured in mW at a reference distance from the mobile terminal and $RSSI(P_0)$ is the associated reference reception strength value. The reception strength value is usually given in dB (deciBel) and is negative. It can be understood as a distance-related attenuation of a radio signal sent by the mobile terminal. The reception level assigned to the antenna can advantageously also be measured in a plurality of separate channels for a plurality of antennas, in particular for each antenna.

In other embodiments, a distance of the mobile terminal from the antenna assigned to the determined reception strength value is calculated from at least one, in particular each, reception strength value determined. Calculating a distance from a reception strength value is a simple task. The more distances are calculated for a mobile terminal, the more precisely its position can be determined.

In a further embodiment, noise of a determined reception strength value or a calculated distance is removed using a filter, for example, a Kalman filter. Kalman filters take the temporal course of a reception strength value into account in order to smooth out strong fluctuations. This takes into account the fact that excessive fluctuations in a very short time with a very high probability are not caused by a corresponding actual change in the position of the mobile terminal.

In a preferred embodiment, the radio signal transmitted by the mobile terminal is received by exactly four antennas, which are each arranged at known distances from one another in the interior of the vehicle, and the position of the mobile terminal is determined from the respectively calculated distances to the four antennas. Four antennas can be arranged particularly symmetrically in the interior of the vehicle and can ensure good coverage of the interior of the vehicle and the surroundings of the vehicle.

In one embodiment, at least one first antenna in a plurality of channels and each radio signal emitted by the at least one first antenna is received by at least one second antenna and the channel is specified from the plurality of channels in that an absolute difference between a calculated distance of the at least one first antenna relative to the at least one second antenna and a known distance between the at least one first antenna and the at least one second antenna is minimal, in particular when averaging over a plurality of first and second antennas. The absolute difference can be calculated with the formula $$D = \frac{1}{n(n-1)} \sum_{i \neq j}^{n} |d_{ij,ber} - d_{ij,bek}|.$$

D is the averaged absolute difference, n the number of participating first and second antennas, i is the index of the at least one first antenna, j the index of the at least one second antenna, $d_{ij,ber}$ is the calculated distance between the at least one first antenna and of the at least one second antenna and $d_{ij,bek}$ is the known distance between the at least one first antenna and the at least one second antenna. In other words, the channel is selected in which the calculated distances of the antennas from one another best match the known distances of the antennas. In this way, the antennas themselves are used to calibrate the method.

In the event of a fault in the specific channel, at least one alternative channel can also be specified from the plurality of channels. The at least one alternative channel preferably corresponds to a next largest difference, for example the second smallest difference averaged over the plurality of antennas. If a disturbance occurs in the specific channel, the system can immediately switch to the at least one alternative channel and the process can be continued with the alternative channel.

In a preferred embodiment, the Bluetooth standard is chosen as the radio technology. The Bluetooth standard is a widely used short-range radio technology for short-range devices (SRD), which is very common in vehicles, for example to connect a mobile terminal to an infotainment system in the vehicle. However, other known or future short-range radio technologies do not depart from the scope of the invention.

The object of the invention is also a vehicle which is configured to evaluate exactly one channel of the radio technology, in particular in a method according to the invention, in order to determine a position of a mobile terminal, which is arranged in an interior of the vehicle or in surroundings of the vehicle and emits a radio signal at a carrier frequency assigned to a channel of a selected radio technology by means of at least one antenna mounted on the vehicle, said antenna receiving the radio signal transmitted by the mobile terminal. Alternatively, a plurality of separate channels of radio technology can be used, in which overlaps in peripheral areas are excluded. With such a vehicle, the position of a mobile terminal in an interior of the vehicle or in surroundings of the vehicle can be determined very precisely.

In a preferred embodiment, the vehicle includes a plurality of, in particular four, antennas, each arranged on the left and on the right symmetrically to a central longitudinal axis of the interior extending in a front-rear direction of the vehicle and at the front and the rear relative to a central transverse axis of the interior extending perpendicular to the central longitudinal axis, and/or the at least one antenna is designed as a Bluetooth antenna (Bluetooth Beacon). The arrangement described is advantageous not least with regard to the seating positions of the usual maximum of four occupants of the vehicle and thus the positions of the respective mobile terminals, but also covers the surroundings of the vehicle in the best possible way.

Figure 1:
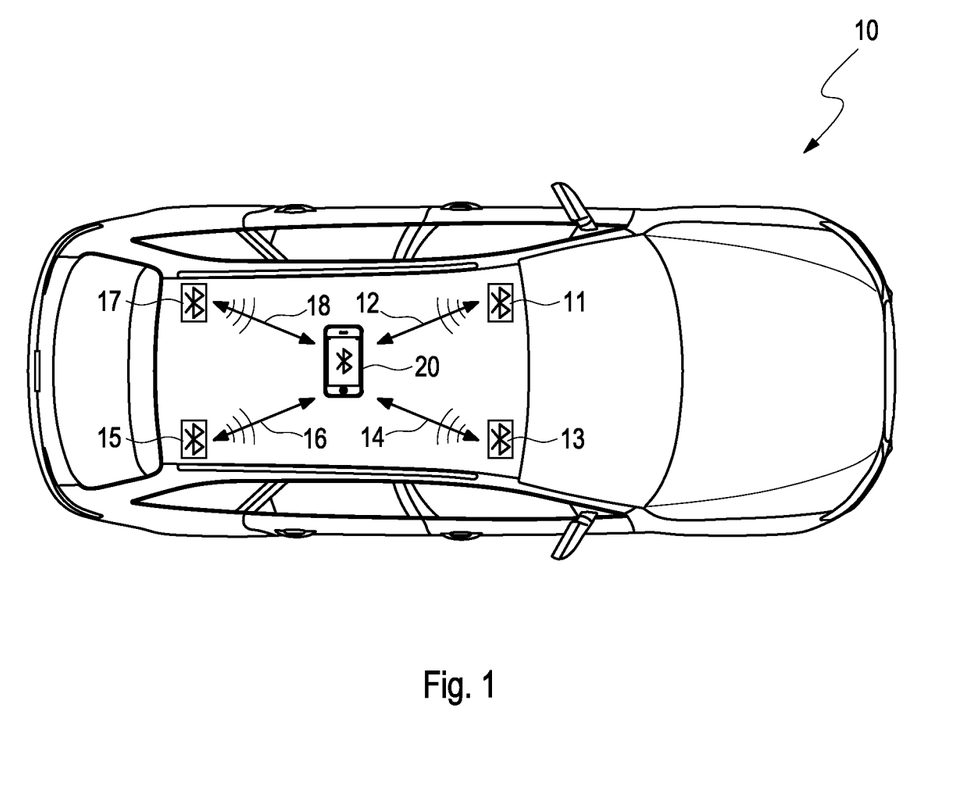
FIG. 1 illustrates a schematic plan view of a vehicle, according to some embodiments of this disclosure.
Figure 2:
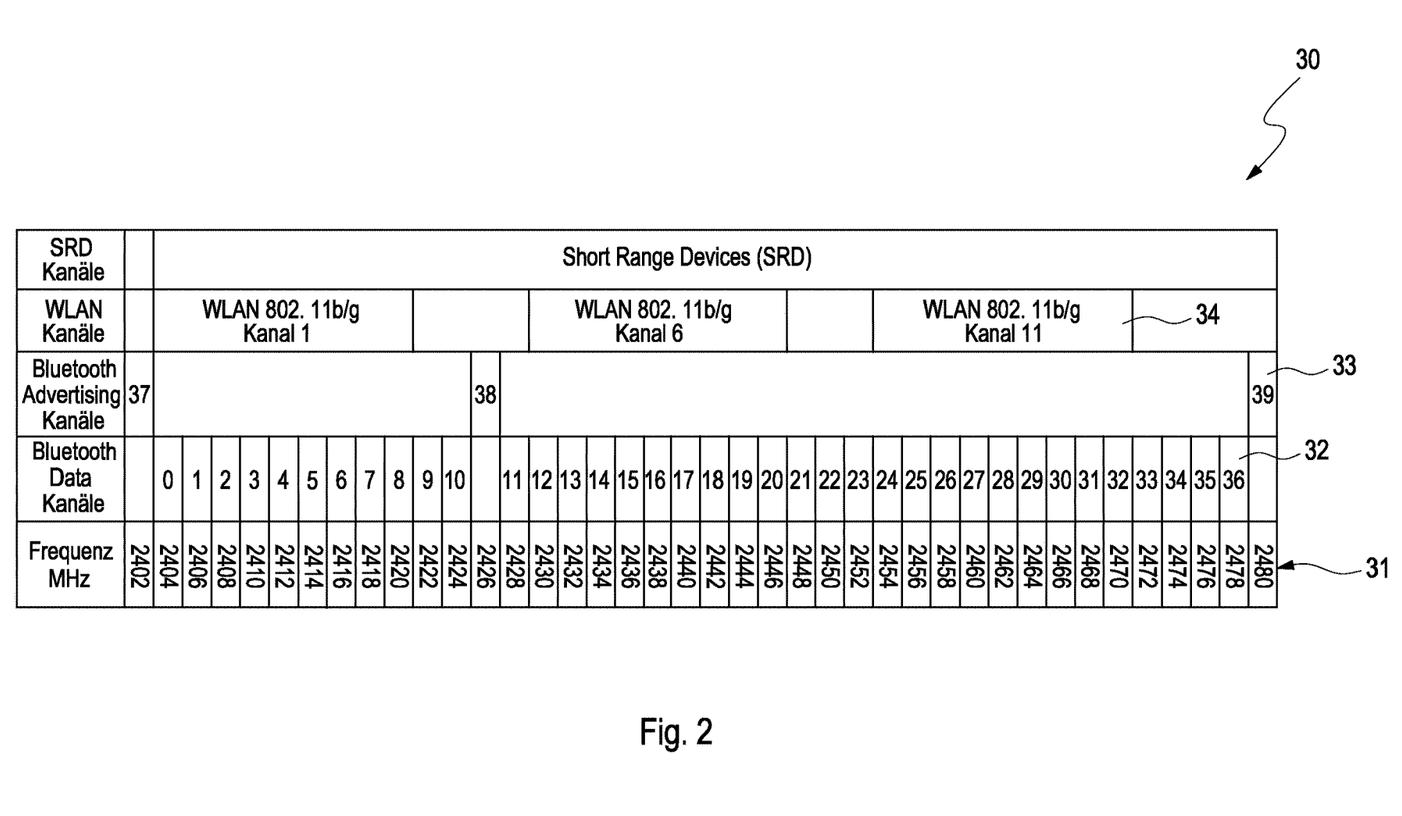
FIG. 2 illustrates a diagram of a division into a plurality of channels of a frequency band reserved for different wireless radio technologies with short range, according to some embodiments of this disclosure.
Figure 3:
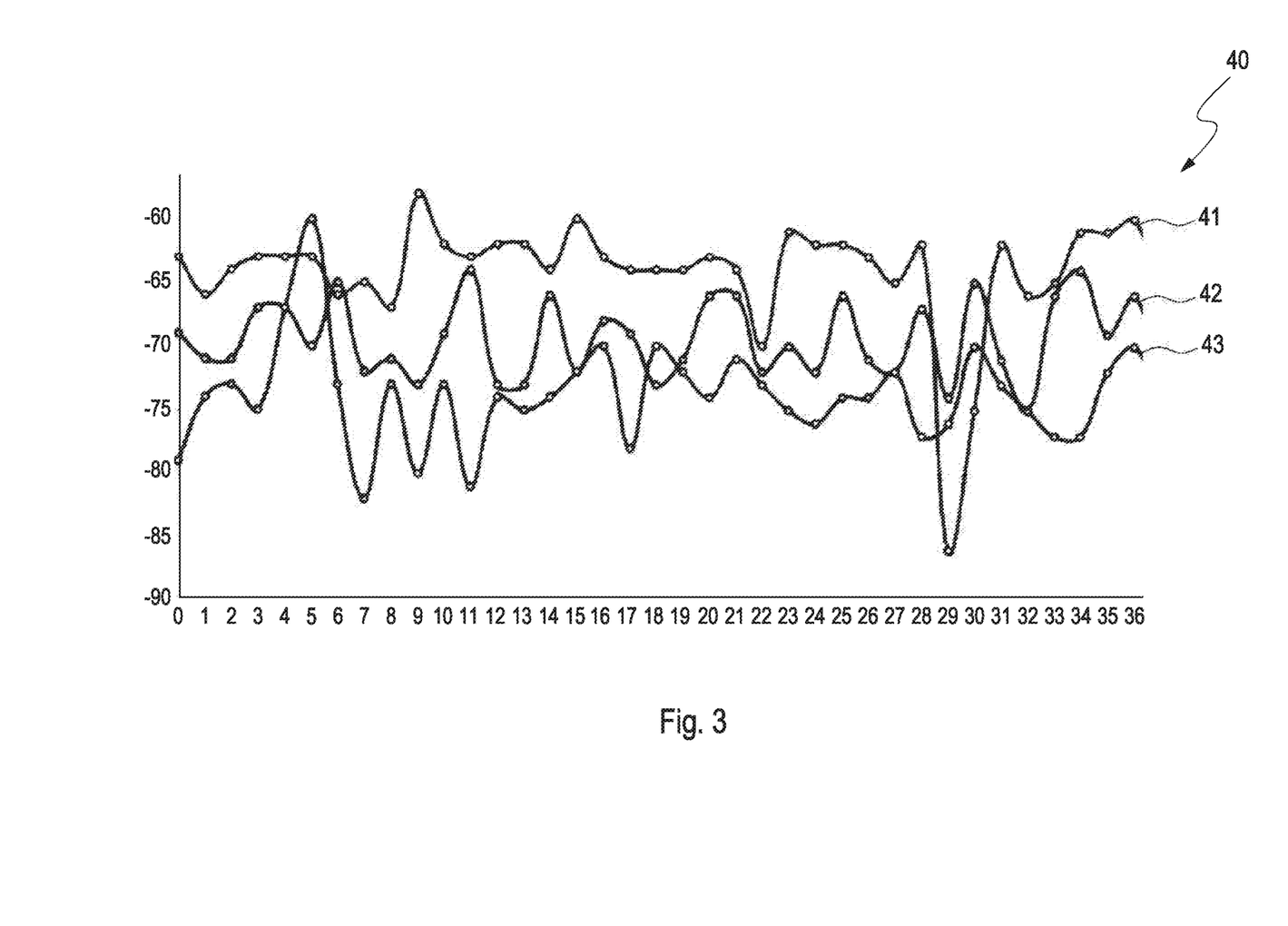
FIG. 3 illustrates a function graph of each reception strength value for three different positions of a mobile terminal in a temporal development, according to some embodiments of this disclosure.
Figure 4:
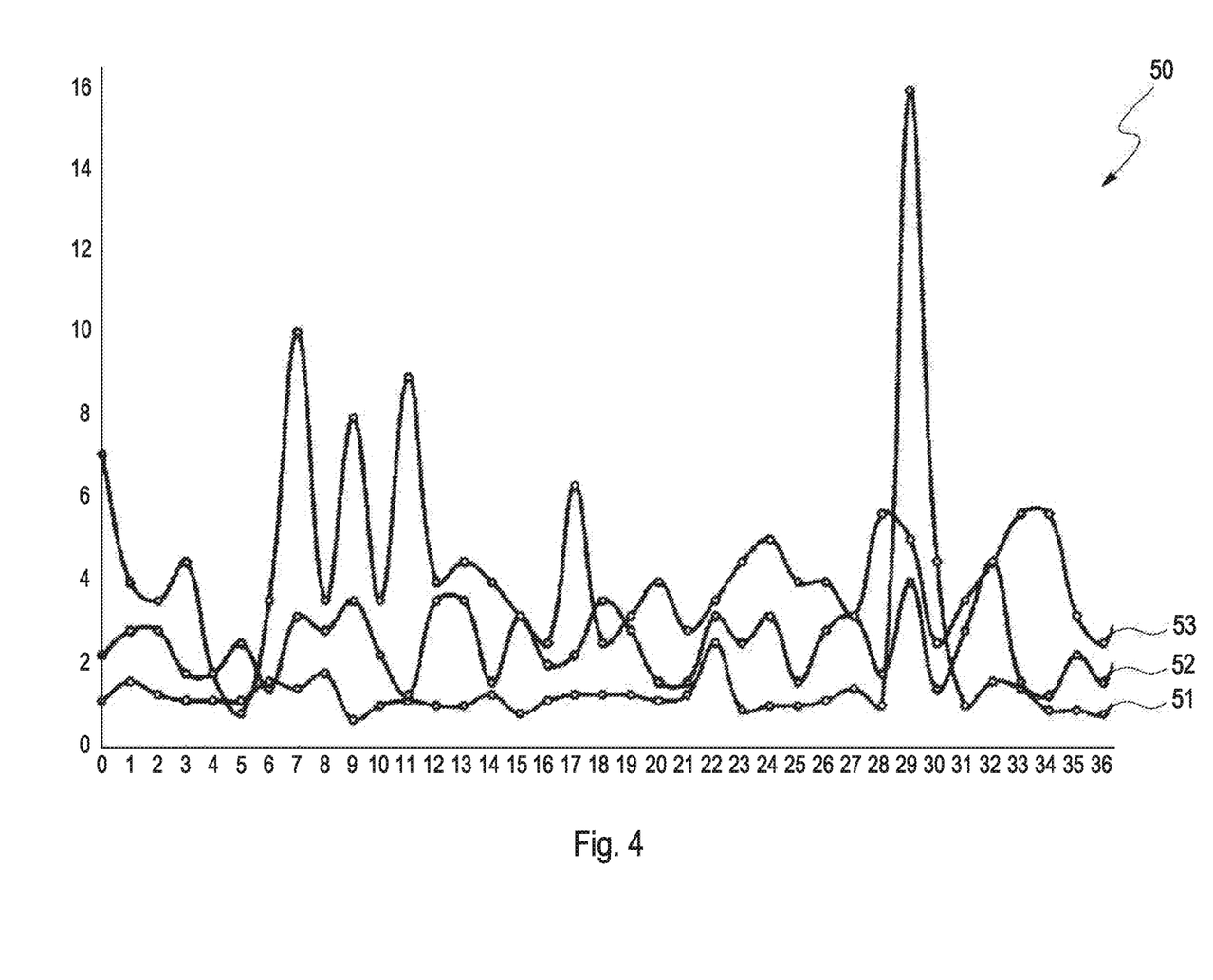
FIG. 4 illustrates a function graph of three distances, which are each calculated from the reception strength values shown in FIG. 3, in a temporal development, according to some embodiments of this disclosure.
Figure 5:
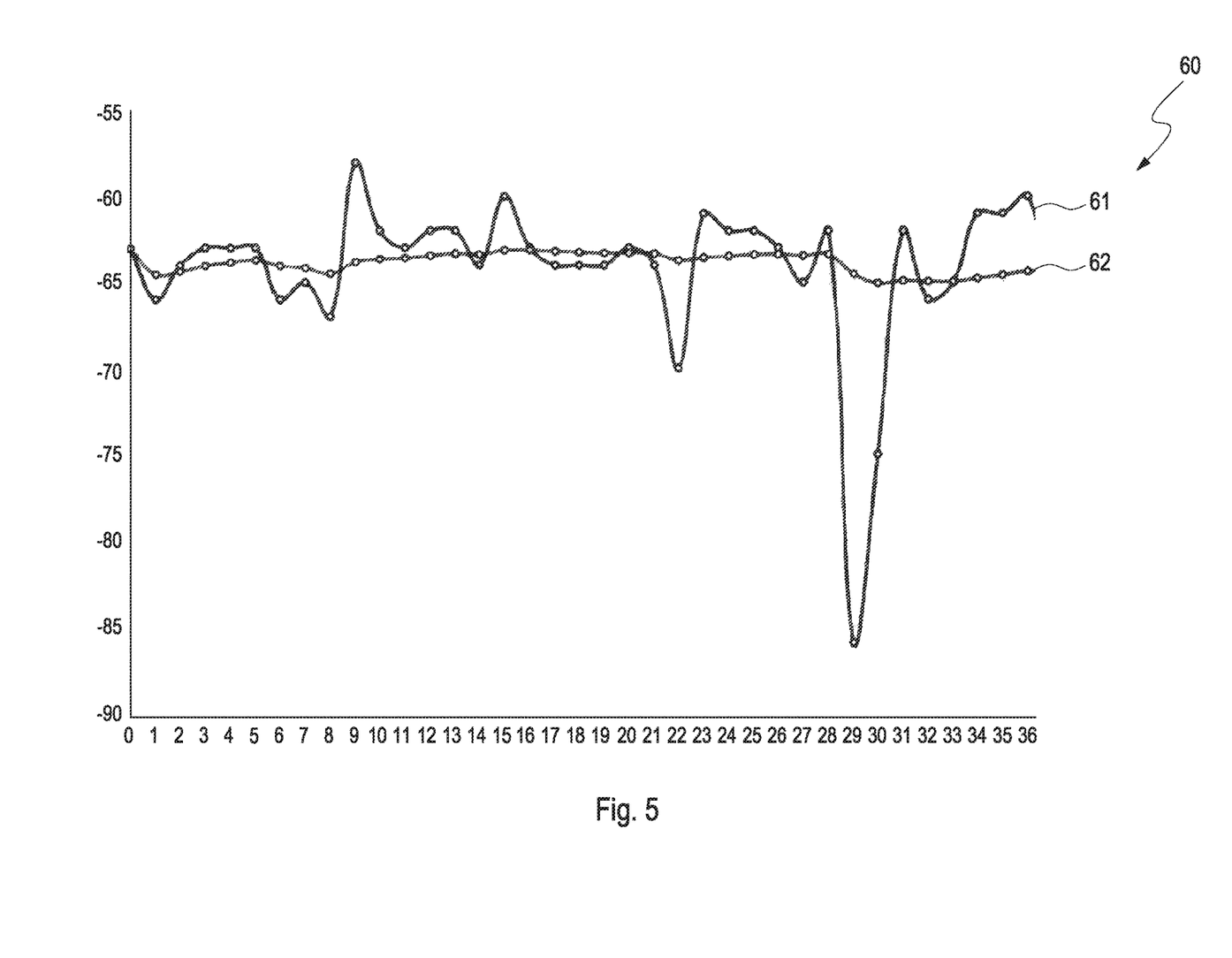
FIG. 5 illustrates a function graph of a reception strength value shown in FIG. 3 in a temporal development together with a reception strength value filtered using a Kalman filter in a temporal development, according to some embodiments of this disclosure.

In the drawings, the invention is depicted schematically by means of embodiments and shall be further described with reference to the drawings. In the drawings:

FIG. 1 is a schematic plan view of an embodiment of a vehicle according to the invention;

FIG. 2 is a diagram of a division into a plurality of channels of a frequency band reserved for different wireless radio technologies with short range;

FIG. 3 is a function graph of each reception strength value for three different positions of a mobile terminal in a temporal development;

FIG. 4 is a function graph of three distances, which are each calculated from the reception strength values shown in FIG. 3, in a temporal development;

FIG. 5 is a function graph of a reception strength value shown in FIG. 3 in a temporal development together with a reception strength value filtered by means of a Kalman filter in a temporal development.

FIG. 1 shows a schematic top view of an embodiment of a vehicle 10 according to the invention. The vehicle 10 has four antennas 11, 13, 15, 17 designed as Bluetooth antennas (Bluetooth beacon). The antennas 11, 13, 15, 17 are each arranged on the left and on the right symmetrically to a central longitudinal axis of the interior extending in a front-rear direction of the vehicle 10 and at the front and the rear relative to a central transverse axis of the interior extending perpendicular to the central longitudinal axis. A mobile terminal 20 is arranged in the vehicle 10 and is at a distance 12, 14, 16, 18 from the antennas 11, 13, 15, 17.

The vehicle 10 is configured to determine a position of the mobile terminal 20, which emits a radio signal at a carrier frequency assigned to a channel 32, 33 of the Bluetooth standard, by means of the four antennas 11, 13, 15, 17 mounted on the vehicle 10, [[said]] the antennas receiving the radio signal transmitted by the mobile terminal 20 in order to evaluate exactly one specific channel 32, 33 of the Bluetooth standard.

FIG. 2 shows in a diagram 30 a division of an ISM frequency band 31 reserved for various short-range wireless radio technologies (Bluetooth, WLAN) into several Bluetooth data channels 32, Bluetooth advertising channels 33 and WLAN channels 34. In steps of 2 MHz, the frequency band comprises a plurality of carrier frequencies between 2402 MHz and 2480 MHz, each of which is assigned to a channel 32, 33, 34.

In the method according to the invention, a radio signal having a carrier frequency assigned to a channel 32, 33 of the Bluetooth standard is emitted by the mobile terminal 20. The radio signal is received by the antennas 11, 13, 15, 17. To determine a position of the mobile terminal 20 in the interior of the vehicle 10, exactly one specific channel 32, 33 of the Bluetooth standard is evaluated.

For each antenna 11, 13, 15, 17, a reception level assigned to the antenna 11, 13, 15, 17 is measured. In a next step, a reception strength value 41, 42, 43 is determined from the measured reception level.

FIG. 3 shows a function graph 40 of a reception strength value 41, 42, 43 for each of three different positions of the mobile terminal 20 in a temporal development.

A distance 51, 52, 53 of the mobile terminal 20 from the antenna 11, 13, 15, 17 associated with the determined reception strength value 41, 42, 43 is then calculated from each determined reception strength value 41, 42, 43.

FIG. 4 shows in a function graph 50 three distances 51, 52, 53, which are each calculated from the reception strength values 41, 42, 43 shown in FIG. 3.

Noise from the determined reception strength values 41, 42, 43 is then removed using a Kalman filter.

FIG. 5 shows a function graph 60 of the reception strength value 61 shown in FIG. 3 over time. The reception strength value 61 corresponds to the reception strength value 41 shown in FIG. 4 and is shown together with a reception strength value 62 filtered using a Kalman filter. As a result of the effect of the Kalman filter, the reception strength value 61, which fluctuates sharply downwards in a very short time, is smoothed.

After removing the noise of the determined reception strength values 41, 42, 43, the position of the mobile terminal 20 is determined from the respectively calculated distances 12, 14, 16, 18 to the four antennas 11, 13, 15, 17.

To calibrate the method, exactly one channel 32, 33 is selected from the ISM frequency band 31 in preparation. For this purpose, a radio signal is emitted from at least one first antenna 11, 13, 15, 17 in a plurality of channels 32, 33 and each radio signal emitted by the at least one first antenna 11, 13, 15, 17 is received by at least one second antenna 11, 13, 15, 17. Subsequently, the channel 32, 33 is specified from the plurality of channels 32, 33 in that an absolute difference between a calculated distance 12, 14, 16, 18 of the at least one first antenna 11, 13, 15, 17 relative to the at least one second antenna 11, 13, 15, 17 and a known distance between the at least one first antenna 11, 13, 15, 17 and the at least one second antenna 11, 13, 15, 17 is minimal, when averaging over a plurality of first and second antennas 11, 13, 15, 17.

The method according to the invention offers the advantage that the position of the terminal 20 can be specified very precisely. The method is therefore suitable for very different applications, only a few of which are listed below by way of example.

First of all, for example, a driver of vehicle 10 and other occupants of vehicle 10 can be distinguished on the basis of their respective terminal 20. Apart from this, pedestrians can also be localized precisely in surroundings of the vehicle 10 if they carry a mobile terminal 20 with them.

Another useful application of the method according to the invention consists in the reliable identification of one of a plurality of garage doors arranged next to one another, for example garage doors of a double garage, if the garage doors are configured to emit radio signals. In this way, exactly the garage door in front of which the vehicle 10 is standing can be opened automatically.

If a mobile terminal 20 can be reliably located in the interior of the vehicle 10 or in surroundings of the vehicle 10, a locked state of the vehicle 10 can also be controlled automatically. A specific mobile terminal 20 arranged outside the vehicle 10 can trigger an automatic unlocking of the vehicle 10. Conversely, a mobile terminal 20 arranged inside the vehicle 10 can prevent the vehicle 10 from being automatically locked.

LIST OF REFERENCE SIGNS 10 vehicle
11 antenna
12 distance
13 antenna
14 distance
15 antenna
16 distance
17 antenna
18 distance
20 mobile terminal
30 diagram
31 frequency band
32 Bluetooth data channel
33 Bluetooth advertising channel
34 WiFi channel
40 function graph
41 reception strength value
42 reception strength value
43 reception strength value
50 function graph
51 distance
52 distance
53 distance
60 function graph
61 reception strength value
62 filtered reception strength value

The invention claimed is:

1. A method for determining a position of a mobile terminal in an interior of a vehicle or in surroundings of the vehicle, the method comprising:
   receiving, by a plurality of antennas mounted on the vehicle and arranged in an interior of the vehicle, a radio signal emitted by the mobile terminal at a carrier frequency assigned to a channel of a radio technology, wherein the plurality of antennas are arranged in the interior of the vehicle at front and rear relative to a central transverse axis of the interior extending perpendicular to a central longitudinal axis;
   evaluating exactly one specific channel of the radio technology for determining the position of the mobile terminal, wherein the evaluation is limited to the specific channel;
   measuring at least one reception level assigned to each one of the plurality of antennas;
   determining a reception strength value for each one of the plurality of antennas from the measured at least one reception level; and
   for each one of the plurality of antennas, calculating a distance of the mobile terminal from the corresponding one of the plurality of antennas using its corresponding determined reception strength value,
   wherein the measuring at least one reception level comprises measuring the at least one reception level assigned to each one of the plurality of antennas in the specific channel and wherein the reception strength value is determined from the measured at least one reception level in the specific channel.

2. The method according to claim 1, further comprising:
   removing a noise of the determined reception strength value or the calculated distance using a filter.

3. The method according to claim 2, wherein the filter comprises a Kalman filter.

4. The method according to claim 1, wherein the plurality of antennas includes exactly four antennas, each one of the four antennas arranged having known distances from other ones of the four antennas in the interior of the vehicle, and wherein the position of the mobile terminal is determined from respectively calculated distances to the four antennas.

5. The method according to claim 1, wherein a radio signal is emitted from a first antenna of the plurality of antennas in a plurality of channels and each radio signal emitted by the at least one first antenna is received by a second antenna of the plurality of antennas.

6. The method of claim 5, wherein the channel is specified from the plurality of channels in that an absolute difference between a calculated distance of the first relative to the second antenna and a known distance between the first antenna and the second antenna is minimal.

7. The method of claim 6, wherein the absolute difference is minimal when averaging over a plurality of first and second antennas.

8. The method according to claim 1, wherein the radio technology comprises a Bluetooth standard.

9. A vehicle configured to evaluate exactly one channel of a radio technology to determine a position of a mobile terminal arranged in an interior of the vehicle or in surroundings of the vehicle, the vehicle comprising:
   a plurality of antennas mounted on the vehicle and arranged in the interior of the vehicle, wherein the plurality of antennas are arranged in the interior of the vehicle at front and rear relative to a central transverse axis of the interior extending perpendicular to a central longitudinal axis, the plurality of antennas configured to:
   receive a radio signal emitted by the mobile terminal at a carrier frequency assigned to the exactly one channel of the radio technology;
   evaluate the exactly one channel of the radio technology for determining the position of the mobile terminal, wherein the evaluation is limited to the exactly one channel;
   measure at least one reception level assigned to each one of the plurality of antennas;
   determine a reception strength value for each one of the plurality of antennas from the measured at least one reception level; and
   for each one of the plurality of antennas, calculate a distance of the mobile terminal from the corresponding one of the plurality of antennas using its corresponding determined reception strength value, wherein, to measure the at least one reception level, the plurality of antennas are configured to measure the at least one reception level assigned to each one of the plurality of antennas in the specific channel and wherein the reception strength value is determined from the measured at least one reception level in the specific channel.

10. The vehicle according to claim 9, wherein the plurality of antennas are arranged in the interior of the vehicle on left and on right symmetrical to the central longitudinal axis of the interior extending in a front-rear direction of the vehicle.

11. The vehicle according to claim 9, wherein at least one of the plurality of antennas is designed as a Bluetooth antenna.

* * * * *